United States Patent [19]
Katsumata et al.

[11] Patent Number: 5,181,149
[45] Date of Patent: Jan. 19, 1993

[54] MAGNETIC RECORDING/REPRODUCING HEAD ASSEMBLY

[75] Inventors: Masao Katsumata, Odawara; Kazuhiro Momata, Chigasaki; Kazuyoshi Adachi, Kanagawa; Tooru Takeura, Odawara; Masahiro Kitada, Tokyo; Yoshihisa Kamo, Tokyo; Toshikane Yoshimatsu, Odawara, all of Japan

[73] Assignee: Hitachi, Ltd., Tokyo, Japan

[21] Appl. No.: 408,690

[22] Filed: Sep. 18, 1989

[30] Foreign Application Priority Data

Sep. 19, 1988 [JP] Japan .................. 63-232310
Aug. 10, 1989 [JP] Japan .................. 1-207717

[51] Int. Cl.$^5$ .......................... G11B 5/127; G11B 5/30
[52] U.S. Cl. ....................... 360/119; 360/113
[58] Field of Search ............ 360/113, 121, 122, 123, 360/129, 119

[56] References Cited

U.S. PATENT DOCUMENTS

| 3,887,945 | 6/1975 | Nepela et al. | 360/113 |
| 3,975,772 | 8/1976 | Lin | 360/113 |
| 4,255,772 | 3/1981 | Perez | 360/113 |
| 4,547,824 | 10/1985 | Best et al. | 360/113 |
| 4,803,580 | 2/1989 | Mowry | 360/113 |

FOREIGN PATENT DOCUMENTS 0093127 7/1975 Japan .
0148411 12/1976 Japan .
0121156 6/1985 Japan .

*Primary Examiner*—David J. Severin
*Attorney, Agent, or Firm*—Antonelli, Terry, Stout & Kraus

[57] ABSTRACT

A magnetic recording/reproducing head assembly comprising a first magnetic path forming member on which a coil is mounted, a second magnetic path forming member which forms a magnetic path in cooperation with the first magnetic path forming member, and a film laminate formed at a front gap portion between the first magnetic path forming member and the second magnetic path forming member. The film laminate includes a magnetic detecting element for detecting a change in a magnetic field and a soft magnetic film or films. This magnetic head assembly is prepared by forming the film laminate on a head base of the head assembly, bonding a core member to the head base with the film laminate formed thereon, and mounting a coil on the core member.

18 Claims, 9 Drawing Sheets

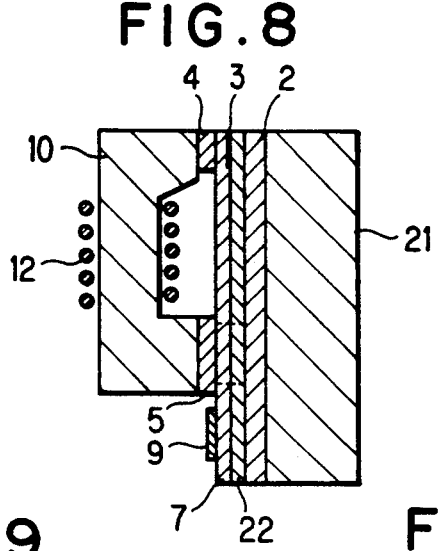
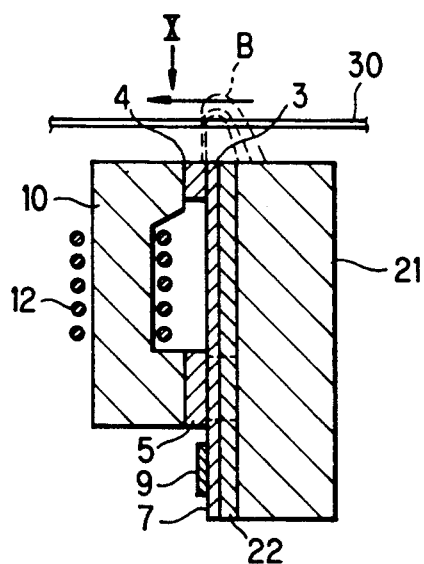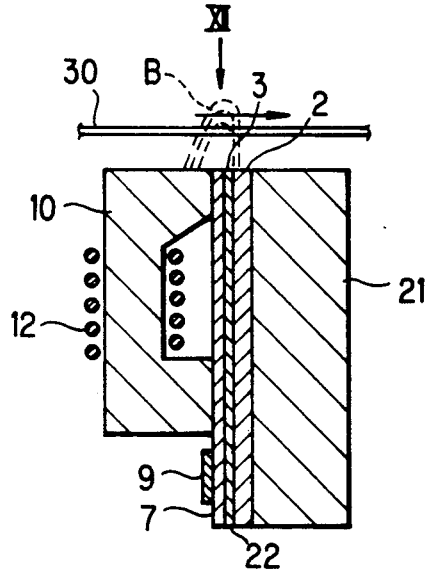
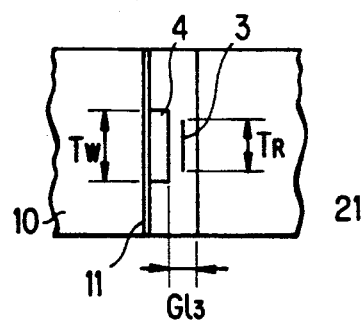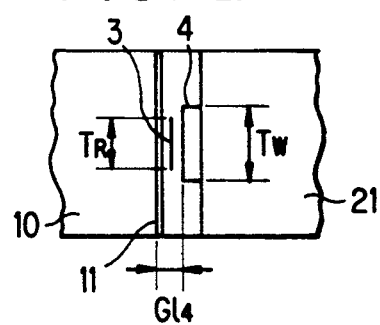

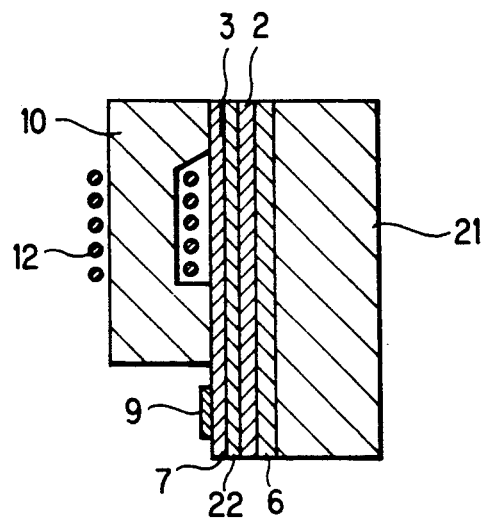
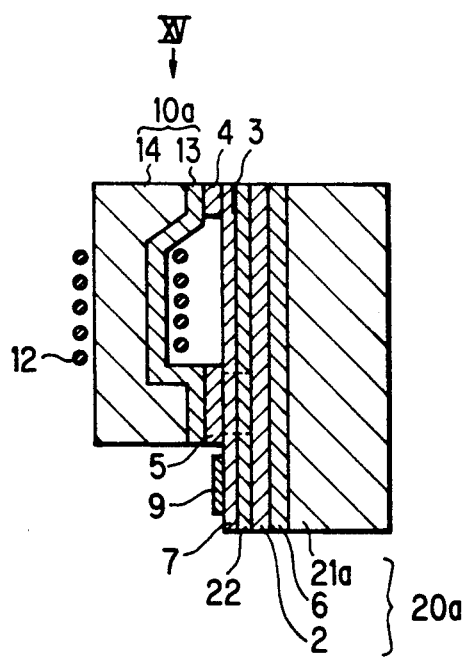
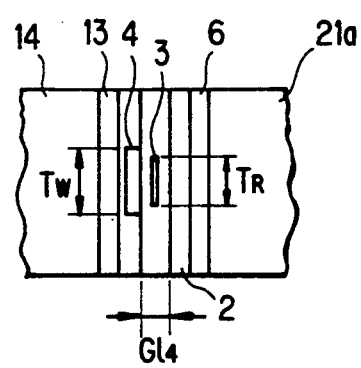

MAGNETIC RECORDING/REPRODUCING HEAD ASSEMBLY

BACKGROUND OF THE INVENTION a. Field of the Invention

This invention relates to a magnetic recording/reproducing head assembly for carrying out recording/reproducing of data with respect to a magnetic recording medium such as a magnetic disk and to a process for preparing the magnetic head assembly.

b. Background Art

Various magnetic head assemblies have been proposed heretofore for recording/reproducing data with respect to a magnetic recording medium. One known magnetic recording/reproducing head assembly as disclosed in Japanese Publication of Unexamined Patent Application (KOKAI) No. 50-93127 utilizes a thin film forming technique.

The magnetic recording/reproducing head assembly disclosed in the publication has, at an end portion of its head base, a thin-film laminate including a magnetoresistance element and insulating films, conductive films having exciting coils formed thereon, soft magnetic films functioning as magnetic poles, which are formed on opposite sides of the magnetoresistance element. This magnetic head assembly, however, has a structural drawback that the recording gap can not be short because there are provided various films such as the magnetoresistance element, the insulating films and the conductive films within the recording gap defined between the soft magnetic films.

To solve this problem, a magnetic head assembly as disclosed in Japanese Publication of Unexamined Patent Application (KOKAI) No. 51-148411 has been proposed. This prior art magnetic head assembly comprises a conductive film with an exciting coil formed thereon and soft magnetic films provided on opposite sides of the conductive film. A magnetoresistance element is provided not between the soft magnetic films but outside the soft magnetic film, adjacent thereto. The head assembly further comprises magnetic films provided on opposite sides of the magnetoresistance element for the purpose of magnetic shield. These films are formed on one end of a base of the magnetic head assembly.

Japanese Publication of Unexamined Patent Application (KOKAI) No. 60-121506 discloses a bulk magnetic recording/reproducing head assembly. This magnetic head assembly, however, is far from practicable. It is quite difficult to connect lead wires directly to either side of a magnetoresistance element having a very narrow reproducing track width because there are no provision for the lead connection. It is further difficult to positioning the magnetoresistane element accurately.

The former two prior art magnetic head assemblies as described above have the magnetoresistance element for detecting the reproducing magnetic field and the soft magnetic films for generating the recording magnetic field. These films are formed precisely by the thin-film forming technique. Therefore, these head assemblies can provide not only excellent S/N ratio and recording/reproducing characteristics, but is capable of improving the recording density.

These magnetic head assemblies, on the other hand, have such a disadvantage that all the element and films are formed by the film forming technique and needs many film forming steps Especially, KOKAI No. 51-148411 additionally includes magnetic films for establishing a magnetic shield and they require additional film forming steps therefor, resulting in additional increase of the manufacturing cost.

The conductive film having an exciting coil formed thereon requires many steps to be prepared. The magnetic head assembly comprising a plurality of conductive layers, therefore, needs a number of steps, which will lower the yield of the products and increase the cost of manufacturing.

Besides, the home appliance manufacturing section or computer manufacturing section of the industry has a keen interest in manufacturing competitive products of quality having a good recording/reproducing characteristics at a lower cost.

SUMMARY OF THE INVENTION

It is therefore an object of the present invention to provide a magnetic recording/reproducing head assembly which has excellent S/N ratio and recording/reproducing characteristics and has an improved recording density and is capable of being manufactured by a reduced number of steps at a lower cost.

The present invention features a magnetic recording/reproducing head assembly comprising a first magnetic path forming member on which a coil is mounted, a second magnetic path forming member which forms a magnetic path in cooperation with the first magnetic path forming member, and a film laminate formed at a front gap portion between the first magnetic path forming member and the second magnetic path forming member. The film laminate includes a magnetic detecting element for detecting a change of a magnetic field and at least one soft magnetic film.

The present invention further features a magnetic recording/reproducing head assembly comprising a film laminate including a magnetic detecting element for detecting a change of a magnetic field and at least one soft magnetic film, a head base on which the film laminate is formed, and a magnetic path forming member on which a coil is mounted. The magnetic path forming member cooperates with the head base to form a magnetic path.

Both the first magnetic path forming member and the second magnetic path forming member may be made of magnetic materials.

Alternatively, both the first magnetic path forming member and the second magnetic path forming member are made of non-magnetic materials in combination with magnetic materials for forming a magnetic path.

Or, one of the first magnetic path forming member and the second magnetic path forming member is made of a magnetic material and another is made of a non-magnetic material and a magnetic material for forming a magnetic path.

When the magnetic path forming member comprising the non-magnetic member and the magnetic member forming a magnetic path are provided on the side where the soft magnetic film is disposed with reference to the magnetic detecting element, the soft magnetic film may be the magnetic member forming the magnetic path. Or, when the magnetic path forming member is comprised of the magnetic member, the soft magnetic film may be used for forming the magnetic path.

The magnetic member may preferably be made of Ni-Zn ferrite or Mn-Zn ferrite. The non-magnetic member may preferably be made of a non-magnetic ceramic having a good resistance to wear such as alumina, alumina-titanium carbide, zirconia, etc.

The soft magnetic film is preferably provided at least on a trailing side of the magnetic detecting element with reference to a travelling direction of a recording medium.

In a preferred mode, another soft magnetic film may be provided at a back gap portion between the first magnetic path forming member and the second magnetic path forming member to magnetically connect the first magnetic path forming member with the second magnetic path forming member.

In another preferred mode, a non-magnetic film having insulating properties is provided adjacent to the magnetic detecting element and lead conductors are provided on the non-magnetic film for supplying a current to the magnetic detecting element. Lead connecting pads are provided at respective ends of the lead conductors for connecting leads.

The soft magnetic film preferably has a thickness larger than a recording gap where a recording field is formed.

The soft magnetic film preferably has a length in a direction of a track width which is longer than that of the magnetic detecting element.

Preferably, the front gap portion has a length in a direction of a track width which is longer than that of said at least one soft magnetic film.

The first magnetic path forming member may have a portion around which the coil is wound, said portion having a length in a direction of a track width shorter than that of the front gap portion or the back gap portion which is shorter than the other.

At least one of the first magnetic path forming member and the second magnetic path forming member may preferably have a bonding surface having spaces for introducing a bonding agent thereinto.

Two or more first magnetic path forming members may be provided for the second magnetic path forming member.

The magnetic recording/reproducing head assembly may be a floating magnetic recording/reproducing head assembly in which the second magnetic path forming means is provided in the form of a slider member having a floating face and the first magnetic path forming means is provided in the form of a core member.

In this case, the slider member may have a recess for receiving the core wound around the core member, and the film laminate may be formed on the core member.

The magnetic detecting element preferably comprises a magnetoresistance element or a Hall element and a shunt film, permanent magnet film, soft film or barber pole film attached to the element to apply a bias magnetic field thereto.

In the specification and the claims appended thereto, the wording "front gap" is used to mean a gap on a recording medium side defined between the first magnetic path forming member and the second magnetic path forming member. The wording "front gap portion" includes a portion of the first magnetic path forming member and a portion of the second magnetic path forming member 31 which define the front gap.

In contrast, the wording "back gap" means a gap on a side remote from the recording medium defined between the first magnetic path forming member and the second magnetic path forming member and "back gap portion" includes portions of the first and second magnetic path forming members which define the gap.

The present invention further features a method for preparing the magnetic recording/reproducing head assembly, comprising the steps of forming a film laminate on a head base of the head assembly, bonding a core member to the head base on which the film laminate is formed, and mounting a coil on the core member. The film laminate includes a magnetic detecting element and a soft magnetic film or films.

In case the soft magnetic films are provided on either side of the magnetic detecting element, the respective soft magnetic films function as magnetic poles in recording when a desired signal current is let to flow through the coil. As a result of this, a recording magnetic field is produced between the soft magnetic films to effect recording of the desired signal on the recording medium.

In case the soft magnetic film is provided only on the first magnetic path forming member side of the magnetic detecting element or on the second magnetic path forming member side of the element, the soft magnetic film and the other, farther magnetic path forming member function as magnetic poles in recording. Thus, a recording magnetic field is formed between the soft magnetic film and the other, farther magnetic path forming member to attain recording of the desired signal.

The recording of the data onto the recording medium is effected by a magnetic field formed on the trailing side. If the soft magnetic film is provided on the trailing side, the recording magnetic field is concentrated to the soft magnetic film. Consequently, a sharp recording magnetic field is formed to make recording of data with the sharp magnetic field. This allows the magnetic recording medium of high coercivity to effect high quality recording of data with high density.

In case the thickness of the soft magnetic film functioning as one magnetic pole is equal to or larger than the distance of the recording gap, a distance between said soft magnetic material or the magnetic path forming member and the magnetic path forming member disposed through the magnetoresistance element is more than twice of the recording gap. Therefore, the magnetic path forming member provided outside of the soft magnetic film with reference to the magnetoresistance element can not be a magnetic pole any more. Thus, the desired soft magnetic film and the magnetic path forming member can be magnetic poles preferentially.

When the magnetic path forming member comprises a non-magnetic material such as a non-magnetic ceramic having a good resistance to wear, the life of the magnetic path forming member can be prolonged.

In case the soft magnetic film or films is or are made of a magnetic material of high saturation flux density, magnetic saturation is hardly caused and a recording magnetic field which causes sufficient magnetization on a recording medium of high coercivity. Thus, recording density can be increased.

In reproducing, a reproducing magnetic field is formed according to the signal recorded on the recording medium and the field is read by the magnetic detecting element.

Since the magnetic detecting element formed of a magnetoresistance effect film is used for reproduction, no noise such as ghost, etc., which would occur by a false gap when an induction type reproducing head assembly is used, is caused. Further, the soft magnetic film also functions as a magnetic shield, so that external magnetic field other than the reproducing magnetic field is not read and the S/N ratio is improved.

The magnetic detecting element and the soft magnetic films may be formed by patterning according to photolithography. Desired sizes, absolute positions and/or relative positions can be attained easily and precisely.

Therefore, possible deviation of the centers in the direction of the track width between the soft magnetic film and the magnetic detecting element can be reduced or minimized, so that there is substantially no need to differentiate the length in the direction of the track width of the magnetic detecting element which determines the reproducing track width from the length in the direction of the track width of the soft magnetic film which determines the recording track width to prevent a noise recording area from being erroneously read during reproduction. Thus, the length in the direction of the track width of the soft magnetic film can be longer and the S/N ratio can be improved.

According to the present invention, the depth of the soft magnetic film from the surface to confront the recording medium in use, the depth of the magnetoresistance element from the surface to confront the recording medium in use, and the positional relationship between the soft magnetic film and the magnetoresistance element, which are important factors determining the recording/reproducing characteristics, can be attained accurately and easily.

As the soft magnetic film and the magnetoresistance element are formed by the thin-film forming technique, variation in the characteristics can be reduced. Therefore, magnetic head assembly of high quality can be produced with a high yield.

Since the soft magnetic film functioning as the magnetic pole is provided separately from the magnetic path forming member, the length in the track width direction of the front gap portion can be determined irrespective of the recording track width which is determined by the length in the track width direction of the soft magnetic film. Thus, the length of the front gap portion can be longer, increasing the bonding area of the first magnetic path forming member and the second magnetic path forming member at the front gap portion. Therefore, the bonding strength of the front gap portion can be increased. In other words, the length in the track width direction of the soft magnetic film which determines the recording track width can be small irrespective of the length in the track width direction of the front gap portion. With this arrangement, the recording density can be increased.

In case the magnetoresistance element is provided on the non-magnetic film having insulating properties and lead conductors are formed on the non-magnetic film together with the lead connecting pads, connection of the leads can be attained easily because of the provision for the lead connection. At the same time, the reliability of connection between the magnetoresistance element and the external circuit for supplying a current for bias magnetic field application to the magnetoresistance element.

In case the first magnetic path forming member has a reduced coil mounting portion having a length in the track width direction shorter than either the length in the track width direction of the front gap portion or the length in the track width direction of the back gap portion, the weight of the first magnetic path forming member can be reduced. Moreover, the distance from the center of said coil mounting portion of the first magnetic path forming member to the outer periphery of the coil mounted thereon can be short, reducing the moment of inertia of the coil. This makes the magnetic head assembly quickly and accurately adjust itself with respect to its floating distance from the recording medium in response to possible vertical vibration of the recording medium or variation or fluctuation in floating distance which may be caused when the head assembly is moved to a desired track.

When either the first magnetic path forming member or the second magnetic path forming member has a bonding surface with recesses formed in relation with the confronting surface of the magnetic path forming member, a bonding agent easily enter the recesses to surely bond the surfaces. Thus, the reliability of connection between the first magnetic path forming member and the second magnetic path forming member can be improved.

With such an arrangement that the slider member is provided, at its surface confronting the core member, with a recess for receiving the coil mounted on the core member, the weight of the core member can be reduced. Moreover, since the core member is not provided with the recess for receiving the coil, the length of the core member in a direction of the movement of the core member relative to the recording medium can be shortened. Consequently, the weight of the core member can be reduced.

The magnetic head assembly according to the present invention does not need conductive layers with coils and insulating layers to be provided in combination with the conductive layers. Therefore, the number of film forming steps can be reduced, simplifying the preparation process and reducing the manufacturing cost. This advantages are especially remarkable when it is required to strengthen the recording magnetic field to increase the recording density.

BRIEF DESCRIPTION OF THE DRAWINGS

FIG. 8 is a sectional view of a modification of the first embodiment;

FIG. 9 is a similar sectional view of a second embodiment of the invention;

FIG. 10 is a view taken in a direction of arrow X in FIG. 9;

FIG. 11 is a sectional view of a modification of the second embodiment;

FIG. 12 is a view taken in a direction of arrow XII in FIG. 11;

FIG. 13 is a sectional view of another modification of the second embodiment;

FIG. 14 is a sectional view of a third embodiment;

FIG. 15 is a view taken in a direction of arrow XV in FIG. 14;

DESCRIPTION OF THE EMBODIMENT

Figure 1:
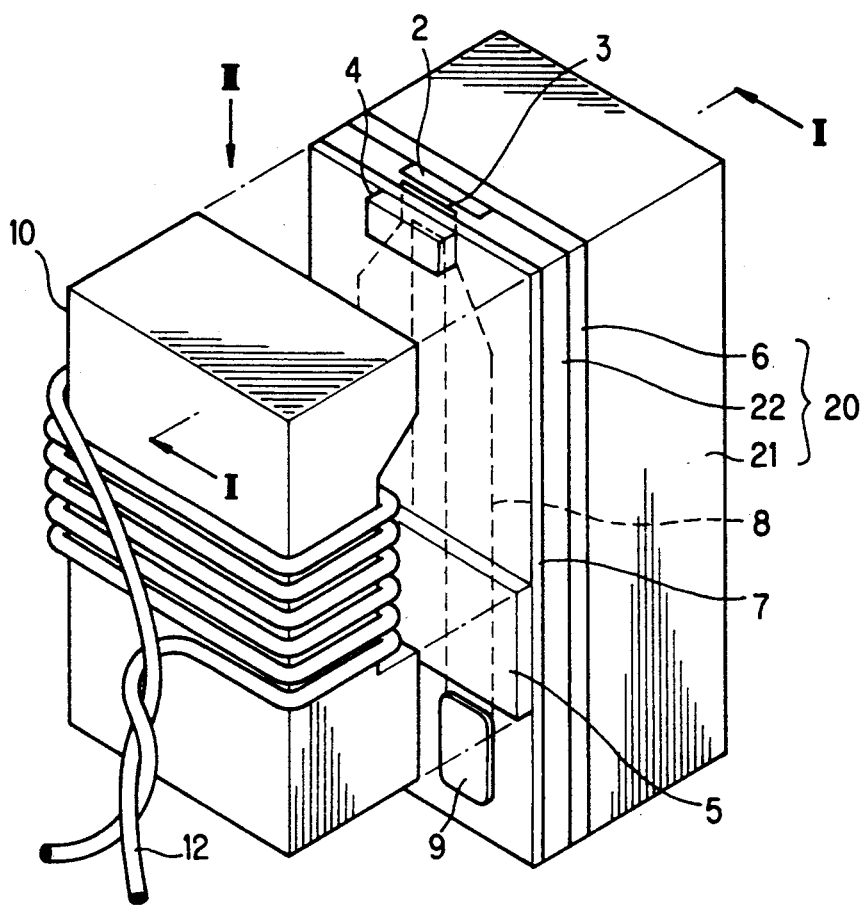
FIG. 1 is a perspective view of a first form of magnetic recording/reproducing head assembly according to the invention.
Figure 2:
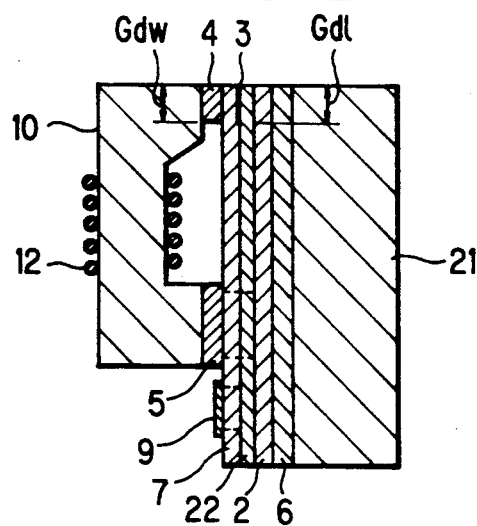
FIG. 2 is a sectional view taken along line II—II in FIG. 1.

Some embodiments of the present invention will be described referring to the drawings.

Same or similar portions or parts are denoted by same or similar numbers or characters and explanation thereof will not be repeated.

A first embodiment of the the present invention will now be described, in which a magnetic recording/reproducing head assembly is provided in a basic form.

As illustrated in FIG. 1, the magnetic recording/reproducing head assembly of the first embodiment comprises a first magnetic member 10 and a second magnetic member 21. A coil 12 is wound around the first magnetic member 10 which constitutes a first magnetic path forming member and the first magnetic member is coupled to the second magnetic member 21. Either magnetic member 10, 21 is made of poly-crystalline or single crystal materials such as Ni-Zn ferrite or Mn-Zn ferrite.

The second magnetic member 21 has a surface confronting the first magnetic member 10 on which a second soft magnetic film 2 is formed through a non-magnetic film 6 having insulating properties. The second soft magnetic film 2 acts as a magnetic pole during recording. The second magnetic member 21, the non-magnetic film 6 and the second soft magnetic film 2 constitute a second magnetic path forming member 20 which forms a magnetic path in cooperation with the first magnetic path forming member 10.

A first soft magnetic film 4 which acts as another magnetic pole in recording is formed on the second soft magnetic film 2 through non-magnetic films 7 and 22 to form a recording gap between the first and second soft magnetic films 2 and 4. The non-magnetic films 7 and 22 are made of $Al_2O_3$ or $SiO_2$ and have insulating properties.

A magnetic detecting element 3 is provided on a front gap side between the non-magnetic films 7 and 22. The magnetic detecting element 3 is formed of a magnetoresistance film (hereinafter referred to as "MR film") and a shunt film for applying a bias magnetic field to the MR film. The MR film is preferably made of a material having a inverse magnetostrictive constant of substantially zero so that the magnetoresistance of the film is not easily affected with an external stress applied thereto. Such a material may, for example, be permalloy containing 80 to 83% of Ni and 20 to 17% of Fe. The thickness of the MR film is preferably about 200 to 900 Å which exhibits the desired magnetoresistance effect.

A back-gap soft magnetic film 5 is formed on a back gap side of the non-magnetic film 7. The back-gap soft magnetic film 5 magnetically connects the first magnetic material 10 with the second magnetic film 2. This film 5 extends through the non-magnetic films 7 and 22 to be connected with the second soft magnetic film 2.

Figure 3:
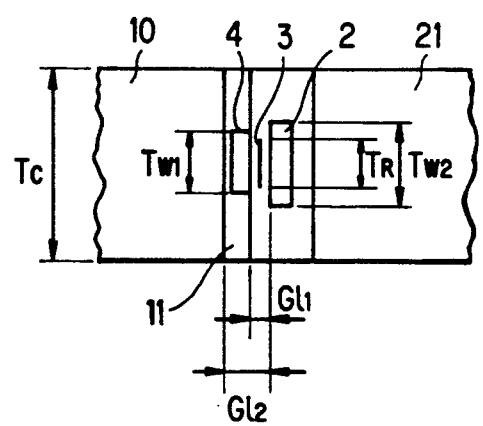
FIG. 3 is a view taken in a direction of arrow III in FIG. 1.
Figure 4:
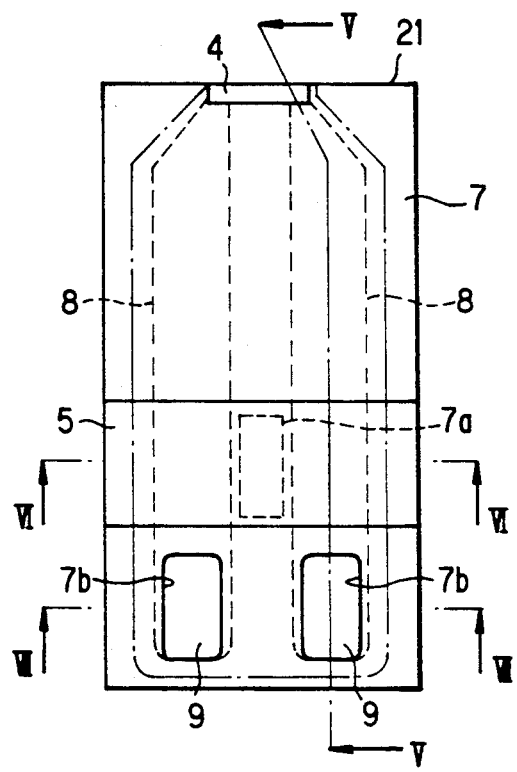
FIG. 4 is a plan view of a first magnetic path forming member employable in the first embodiment shown in FIG. 1.

The first soft magnetic film 4 and the second soft magnetic film 2 establish a magnetic shield for the magnetic detecting element 3 during reproduction. The so established magnetic shield serves to shield external magnetic fields other than the reproducing magnetic field to improve the reproduction resolution in the reproduction of data recorded on a recording medium. The reproduction resolution is not influenced by the thicknesses of the first and second soft magnetic films 4 and 2. The reproduction resolution, on the other hand, depends on the width of the shield, i.e., the distance between the first soft magnetic film 4 and the second soft magnetic film 2 as denoted by $Gl_1$ in FIG. 3. Therefore, the thicknesses of the first soft magnetic film 4 and the second soft magnetic film 2 may be arbitrarily selected with a view to only attaining the magnetic shield in the reproduction. The thicknesses, however, must not be so thin that the magnetic resistances of the first soft magnetic material film 4 and the second magnetic film 2 are lowered to that of the MR film. If the first and the second soft magnetic film are made of materials having a permeability similar to that of the MR film, they may be as thick as about 0.5 μm or more, which is thicker than the MR film. The thicknesses, therefore, may be selected from a view point of recording characteristics, without considering the magnetic shielding effects. The thicknesses of the first soft magnetic film 4 and the second soft magnetic film 2 are substantially the same as the distance $Gl_1$ between the first soft magnetic film 4 and the second soft magnetic film 2 in the embodiment as illustrated in FIG. 3.

Since the first soft magnetic film 4 and the second soft magnetic film 2 function as magnetic poles in recording, they are preferably made of materials having a high saturation flux density and a high permeability to apply a strong magnetic field to the recording medium. When it is required to attain a high recording density, the recording medium is preferably made of materials of high coercivity. In fact, a sputtered recording medium or plated recording medium having a coercivity of 1,000 oersteds or higher has come to be used recently. To meet the requirement and trend, the first soft magnetic film 4 and the second soft magnetic film 2 are made of Fe-Al-Si alloy in the embodiment as illustrated.

The position of the magnetic detecting element 3 disposed between the first soft magnetic film 4 and the second soft magnetic film 2 is not centered between or equidistant from the respective films. It is desirable that the magnetic detecting element 3 be closer to either one of the soft magnetic films. In the embodiment as illustrated, the magnetic detecting element 3 is placed closer to the first soft magnetic material film 4 with its shunt film confronting the film 4. This arrangement is preferred because the MR film is readily applied with a bias magnetic field by magnetic coupling with the soft magnetic material closer to the magnetic detecting element 3.

The layers formed between the first magnetic member 10 and the second magnetic member 21 are illustrated in FIGS. 4 to 7 and will be described in detail below.

Figure 5:
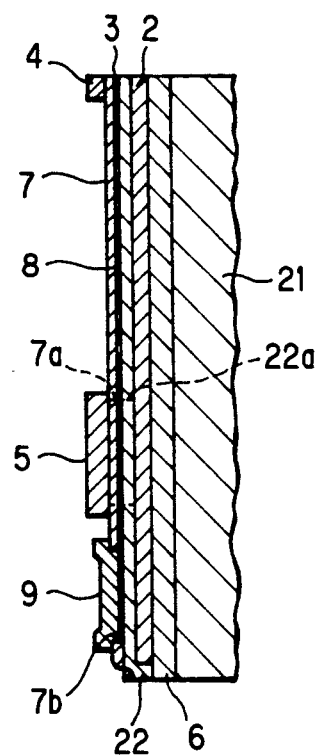
FIG. 5 is a sectional view taken along line V—V in FIG. 4.

As illustrated in FIG. 5, the second soft magnetic film 2 is formed on the second magnetic member 21 through the non-magnetic film 6. The non-magnetic film 22 having insulating properties is formed on the second soft magnetic film 2. On the non-magnetic film 22 are formed the magnetic detecting element 3 and lead conductors 8, 8 which are connected to the shunt film of the magnetic detecting element 3.

The non-magnetic film 7 is formed on the lead conductors 8, 8 and the magnetic detecting element 3. An opening 7a and openings 7b, 7b are formed on the non-magnetic film 7 at portions near the central portion of the film 7 and ends of the lead conductors 8,8, respectively. The non-magnetic film 22 also has an opening 22a near the central portion thereof which is aligned with the opening 7a of the film 7.

On the non-magnetic film 7 are provided the back-gap soft magnetic film 5 and lead connecting pads 9, 9 for connecting leads (not shown) extending to an external circuit for driving the magnetic detecting element 3. The lead connecting pads 9, 9 are formed by plating with solder.

Figure 6:
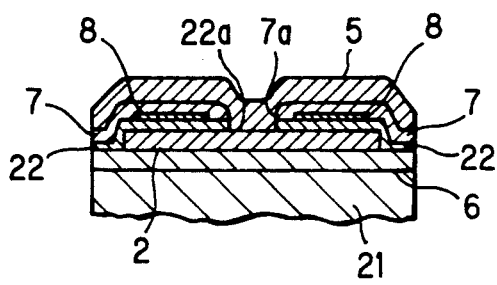
FIG. 6 is a sectional view taken along line VI—VI in FIG. 4.
Figure 7:
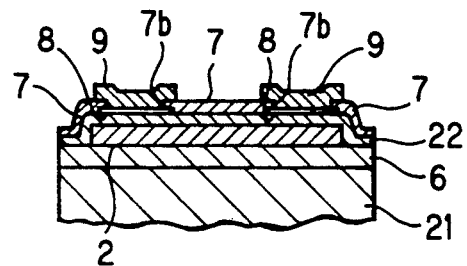
FIG. 7 is a sectional view taken along line VII—VII in FIG. 4.

The back-gap soft magnetic film 5 is connected to the second soft magnetic film 2 through the openings of the non-magnetic films 7 and 22 as best shown in FIG. 6. The lead connecting pads 9, 9 are connected to the ends of the lead conductors 8, 8 through the openings 7b, 7b of the non-magnetic film 7, respectively.

Between the lead conductors 8, 8 and the lead connecting pads 9, 9 are preferably provided intermediate layers such as an adhesion enhancing film for enhancing the adhesion between the conductors and the pads and/or a diffusion preventing film for preventing diffusion of metallic atoms. The materials of the intermediate layers such as an adhesion enhancing film and a diffusion preventing film should be selected considering the materials of the lead conductors 8 and the lead connecting pads 9 and the conditions such as a thermal history, etc., during the manufacturing or in the actual use of the magnetic head assembly to withstand such conditions.

These films may be formed by known appropriate techniques such as deposition, sputtering, plating, etc. and may be configured by using patterning techniques such as photo-lithography, etching, or ion-milling.

When the magnetic detecting element 3 and the first soft magnetic film 4 are formed, a machining termination detecting pattern may preferably be formed simultaneously. The pattern is a mark indicative of a position to terminate the machining of a surface of the magnetic head assembly which surface is to confront the recording medium when in use. The pattern may be in the form suitable for eye check when the machining is carried out by observing the machining surface with a microscope or may be formed by an electrical resistance element. In the latter case, the machining is carried out while measuring the resistance value and the machining is terminated when the measured resistance reaches a given value. These machining termination detecting patterns may be advantageously used to machine the surface of the magnetic recording/reproducing head assembly precisely.

The depth of the first soft magnetic film 4 in a direction perpendicular to the major face of the recording medium when the magnetic head assembly is in use is denoted by Gdw in FIG. 3 and it is preferably 0.5 to 10 μm to achieve a good recording efficiency. The depth of the magnetic detecting element 3 in the direction perpendicular to the major face of the recording medium, namely, the depth from the surface of the magnetic detecting element 3 which surface is to confront the recording medium, is denoted by Gdl in FIG. 3.

The widths of the first soft magnetic film 4 and the second soft magnetic film 2 in a direction of the width of a track of the recording medium in use which are denoted by $T_{W1}$ and $T_{W2}$, respectively, are smaller than the width $T_C$ of the first magnetic member 10 and slightly larger than the width $T_R$ of the magnetic detecting element 3 as shown in FIG. 3.

The second magnetic member 21 with the films so formed thereon is bonded with an adhesive 11 to the first magnetic member 10. The first magnetic member 10 has a recessed portion for mounting the coil 12 thereon. The coil 12 is wound around the first magnetic member 10 at the recessed portion thereof.

As the adhesive, a glass adhesive can be employed advantageously, because it is stable against aging of the bonding both at the front gap portion and the back gap portion.

An operation of the first embodiment will now be described.

In recording, a current is supplied to the coil 12 to generate a magnetic field between the first soft magnetic film 4 and the second soft magnetic film 2. According to this magnetic field, the confronting recording medium is magnetized to record signals.

The reason why the gap between the first soft magnetic film 4 and the second soft magnetic film 2 preferentially operates as a recording gap generating a recording magnetic field is as follows: the thickness of the first soft magnetic film 4 is equal to or larger than the space $Gl_1$ between the first soft magnetic film 4 and the second soft magnetic film 2, and the space $Gl_2$ between the first magnetic member 10 and the second soft magnetic film 2 is twice or more of $Gl_1$ so that it does not provide a recording gap any more.

As described above, the first soft magnetic film 4 and the second soft magnetic film 2 are made of magnetic materials having a high saturation flux density such as an Fe-Al-Si alloy. For this reason, magnetic saturation is hardly caused and a recording magnetic field can be produced which is sufficient to cause magnetization in a recording medium of high coercivity. Thus, the recording density can be improved. According to the experiments conducted by the inventors, a recording density as high as 30,000 F.C.I. was attained for a recording medium having a coercivity of 1,000 when Fe-Al-Si alloy magnetic members of 1 to 2 μm thick were employed as the soft magnetic films of the magnetic head assembly.

In reproduction, reproducing magnetic field produced according to the signals recorded on the recording medium is read by the magnetic detecting element 3.

Since the magnetic detecting element 3 comprising the MR film is used for reproduction, noises such as ghost etc., can be eliminated, which would be caused by a false gap of an induction reproducing head assembly. The first soft magnetic film 4 and the second soft magnetic film 2 establish a magnetic shield, which prevents the reproducing head assembly from reading external magnetic fields other than the reproducing magnetic field. Thus, the S/N ratio can be improved.

The relative speed between the recording medium and the magnetic recording/reproducing head assembly has no influence upon the reproduction characteristics in the reproduction by the magnetic detecting element 3. Therefore, even when the magnetic head assembly is used with a magnetic disk of 5 inches or less which has a rather low circumferential speed, the magnetic head assembly can read data and produces a large output from the magnetic disk having a record of high recording density.

As described above, the length $T_R$ in the track width direction of the magnetic detecting element 3 which determines the reproduction track width is shorter than the length $T_{W1}$ in the track width direction of the first soft magnetic film 4 which determines the recording track width. This arrangement can advantageously prevent reading of a noise recording area which may possibly be caused by a tracking error of the magnetic recording/reproducing head assembly in relation with the recording medium.

Since the films on the magnetic member 21 may be formed by patterning using a photolithography technique etc., they may be readily aligned with each other with a precision of 1 μm or less. Offsets from a center in the track width direction of the first soft magnetic film 4, the second soft magnetic film 2 and the magnetic detecting element 3 can therefore be very small. For this reason, it is possible to minimize a difference between the length $T_R$ of the magnetic detecting element 3 in the track width direction and the length $T_{W1}$ of the first soft magnetic film 4 in the track width direction, which difference is provided to prevent unresired reading of the noise recording area possibly caused by a tracking error. Therefore, the length $T_R$ of the magnetic detecting element 3 which determines the reproduction track may be longer to improve the S/N ratio.

The depth $G_{dw}$ of the first soft magnetic film 4 from the surface to confront the recording medium in use, the depth $G_{dl}$ of the magnetic detecting element 3 from the surface to confront the recording medium in use, and the positional relationship between the first soft magnetic film 4 and the magnetic detecting element 3, which are important factors influencing in the recording and/or reproducing characteristics, can be formed easily and precisely according to the embodiment. Consequently, not only the recording and/or reproducing characteristics can be improved very much, but also possible fluctuation in performance can be reduced. Thus, magnetic head assemblies of high quality can be produced with a high yield.

The bonding length of the first magnetic member 10 and the second magnetic member 21 in the track width direction at the front gap portion is determined by the length $T_C$ of the first magnetic member 10 in the track width direction. The length $T_C$ may be determined and may be longer, irrespective of the recording track width $T_{W1}$ because the magnetic head assembly has the magnetic poles provided by the first soft magnetic film 4 and the second soft magnetic film 2, regardless of the first magnetic member 10 and the second magnetic member 21. As a result of this, the bonding area may be increased to improve the bonding strength between the first magnetic member 10 and the second magnetic member 21 at the front gap portion. This is especially advantageous in that the surface of the magnetic recording/reproducing head assembly can be subjected to machining without taking special care for possible peeling or removal at the bonding portion.

On the other hand, the length $T_{W1}$ of the first soft magnetic film 4 in the track width direction which determines the recording track width can be shortened irrespective of the length $T_C$ of the first magnetic member 10 in the track width direction. Thus, the recording density in the track width direction can be increased.

Although the magnetic detecting element 3 is very thin, there is no fear that the element 3 is broken at steps or due to unevenness of the non-magnetic film on which it is formed, because the film is flat and free from steps or unevenness. The lead connecting pad 9 is formed by plating with solder suited for connection of the lead (not shown) extending to the external circuit. Therefore, disconnection or peeling of the connecting portion is hardly caused. This can improve the reliability of the connection.

Although the shunt film is used as means for applying a bias magnetic field to the MR film in the embodiment as illustrated, such means is not limited to the shunt film and it may alternatively be a permanent magnet film, a current bias film a soft film, or a barber pole film, so long as they can apply a bias magnetic field to the MR film.

The first soft magnetic film 4 and the second soft magnetic film 2, which are made of Fe-Al-Si alloy in the embodiment as just described, may alternatively be made of a material having a high saturation flux density, such as a Ni-Fe magnetic material film, a laminate of Ni-Fe and an insulator, a Co-metal amorphous film, a Fe-C multilayered film, etc.

The connection of the lead connecting pad 9 and the lead extending to the external circuit is made by soldering, ultrasonic bonding, ball bonding, etc. The material of the lead connecting pad 9 may be selected from those which are suitable for these connecting method. For example, Au may be employed as the material of the pad. Since Au is good in solderability or suitable for ultrasonic bonding, the bonding strength can be improved when Au is employed. This material can also be easily deposited by plating or sputtering.

The first magnetic member 10 and the second magnetic member 21 may be bonded not only by glass as in the embodiment just described but by other adhesives such as organic adhesives, for example, an epoxy resin adhesive. When an organic adhesive is employed, there is no need that the first magnetic member 10 and the second magnetic member 21 be made of the same material. With this respect, the magnetic members 10 and 21 are desired to be made of the same material when the glass adhesive is employed, because bonding strain is possibly caused due to a difference in coefficients of thermal expansion between the members when the members are heated at a high temperature to melt glass.

The back-gap soft magnetic film 5 is provided at the back gap portion for reducing the magnetic resistance at the bonding portion of the first magnetic member 10 constituting the first magnetic path forming member and the second magnetic path forming member 20.

Therefore, if the magnetic resistance is not so large due to the structural factors, it may be omitted.

The second magnetic member 21, which is made of magnetic ferrite in the embodiment as described, may alternatively be made of non-magnetic ceramics such as alumina, alumina-titanium carbide, zirconia, etc. In this case, not only similar effects can be attained with a similar structure, but also the resistance to wear of the second magnetic path forming member 20 can be improved.

The descriptions of the materials of the shunt film, soft magnetic films 2 and 4, lead connecting pad 9, adhesives and the second magnetic member 21, or provision of the back-gap soft magnetic film 5 may also referred to in the embodiments as will be described later.

The non-magnetic film 6 is provided to level or smooth the surface of the second magnetic member 21 when it is made of porous materials such as polycrystalline ferrite or sintered non-magnetic ceramics. If a soft magnetic film is directly formed on such porous materials without interposing the layer like 6, the surface of the soft magnetic film becomes uneven, which would deteriorate the magnetic characteristics. In case the second magnetic member 21 is made of single crystal materials and has no rough or uneven surface, or the thickness of the second soft magnetic film is so large that the roughness of the underlayer does not influence the surface of the second soft magnetic film, the non-magnetic film 6 may be omitted as shown in FIG. 8.

A second form of magnetic recording/reproducing head assembly according to the present invention will now be described referring to FIGS. 9 and 10.

The magnetic recording/reproducing head assembly of this second embodiment comprises, as illustrated in FIG. 9, a second magnetic member 21 on which a non-magnetic film 22 having insulating properties, a magnetic detecting element 3, a first soft magnetic film 4 and a back-gap soft magnetic film 5 are formed in this order, and a first magnetic member 10 around which a coil 12 is wound to constitute a first magnetic path forming member. The first and the second magnetic member are bonded by an adhesive 11. The second embodiment is substantially the same as the first embodiment except that the non-magnetic film 6 and the second soft magnetic film 2 of the first embodiment are omitted in the second embodiment. In the second embodiment, the second magnetic path forming member is constituted only by the second magnetic member 21.

It is now assumed that a recording medium 30 travels in a direction of arrow shown in FIG. 9 relative to the recording/reproducing head assembly of the second embodiment.

In recording, a recording magnetic field B is formed at a gap $G_{13}$ between the first soft magnetic film 4 and the second magnetic member 21 as shown in FIG. 9. Since the soft magnetic film 4 is provided on the trailing side relative to the travelling direction of the recording medium, the recording magnetic field B is formed sharp on the trailing side. The recording medium 30 is thus recorded by the sharp recording magnetic field at the trailing side of the magnetic recording/reproducing head assembly. Therefore, even the magnetic recording medium of high coercivity can be recorded with high quality with high density.

In the second embodiment, the second magnetic member 21 functioning as a magnetic pole on the leading side is made of a magnetic ferrite which has not so high saturation flux density. This second embodiment, therefore, is not so good in performances such as an output of recording magnetic field as the first embodiment. However, it has similar effects to those of the first embodiment except that it can not produce so large output and it can not have so high recording density. It, on the other hand, has such an advantage that the structure is simplified and the manufacturing cost is reduced because the second soft magnetic film 2 and the non-magnetic film 6 are omitted.

A modification of the second embodiment will be described, while referring to FIGS. 11 and 12.

The magnetic recording/reproducing head assembly according to this modification has a configuration adapted for a travelling direction of the recording medium which is opposite to that of the second embodiment. As illustrated in FIG. 11, a second soft magnetic film 2, a non-magnetic member 22 having insulating properties, a magnetic detecting element 3 and a non-magnetic film 7 are formed on a second magnetic member 21. The so formed second magnetic member 21 is bonded with an adhesive 11 to a first magnetic member 10 constituting a first magnetic path forming member. In this modification, a second magnetic path forming member is constituted by the second magnetic member 21 and the second soft magnetic film 2.

This modification includes the second soft magnetic film 2 which is provided instead of the first soft magnetic film 4 in the second embodiment. Thus, the soft magnetic film is provided only at the trailing side of the magnetic recording/reproducing head assembly as in the second embodiment. This configuration is similar to that of the second embodiment and can attain similar effects to those of the second embodiment.

In this modification and the second embodiment, a non-magnetic member 6 may further additionally be formed immediately on the second magnetic member 21 as illustrated in FIG. 13. In this case, the second magnetic member 21 may be formed of porous materials because it can smooth the unevenness of roughness of the second magnetic member 21.

Referring to FIGS. 14 and 15, there is illustrated a third embodiment of the present invention.

The magnetic recording/reproducing head assembly according to the third embodiment comprises a first non-magnetic member 14 on which a coil is wound, a second non-magnetic member 21, films similar to those employed in the foregoing embodiments, and a magnetic film 13 formed on the first non-magnetic member 14. The third embodiment is substantially the same as the first embodiment except that the first magnetic member 10 and the second magnetic member 21 are made of non-magnetic materials and the magnetic film is formed on the first non-magnetic member 14. In the third embodiment, a first magnetic path forming member 10a is constituted by the first non-magnetic member 14 and the magnetic film 13, while a second magnetic path forming member 20a is constituted by a second non-magnetic member 21a, a non-magnetic film 6 and a second soft magnetic film 2.

The first non-magnetic member 14 and the second non-magnetic member 21a are made of non-magnetic ceramics which are excellent in resistance to wear, such as alumina, alumina-titanium carbide, zirconia, etc.

The magnetic film 13 is made of the same materials as those of the soft magnetic films 2 and 4. This film 13 is formed continuously on the first non-magnetic member 14 from the front gap end to the back gap end.

The magnetic film 13 constitutes part of a magnetic path in recording. Therefore, the magnetic film 13 preferably has a thickness as large as possible to lower the magnetic resistance. Preferably, the magnetic film 13 is as thick as 5μm or more. Although the film may be formed by sputtering, such a thick film can more easily and effectively be formed by plating.

To form the film by plating, a metal to be used as an electrode, for example, Cu is preliminarily deposited with the same material as that of the magnetic film 13 by sputtering and the so prepared electrode is used to deposite the material on the first non-magnetic member 14 to form the magnetic film 13. In this case, Ni-Fe alloy may preferably be used as the material of the magnetic film 13. Fe-Al-Si alloys etc. may be suitably employed as materials of deposition by sputtering.

Since the magnetic film 13 and the first soft magnetic film 4 are made of the same metal, diffusion bonding can be utilized to bond them without a gap therebetween. When the bonding is made by using a bonding agent such as glass, an increased bonding pressure is used so as not to leave a gap between the magnetic film 13 and the first soft magnetic film 4.

The magnetic recording/reproducing head assembly of the third embodiment can attain the effects similar to those of the first embodiment. It further provides good resistance to wear on a surface confronting the recording mediun in use because both the first non-magnetic member 14 and the second non-magnetic member 21a are made of ceramics having excellent resistance to wear. Thus, the life of the magnetic head assembly can be prolonged.

For this reason, the configuration of the third embodiment is especially suitable for use in a magnetic head assembly for a magnetic tape drive, magnetic head assembly for a floppy disk drive, or a magnetic head assembly for a hard disk drive, in which the recording media get in contact with the magnetic head assemblies to wear the same.

The foregoing embodiments are directed to basic configurations of the magnetic recording/reproducing head assembly. These configurations may be applied to magnetic disk drives as will be described below.

Figure 16:
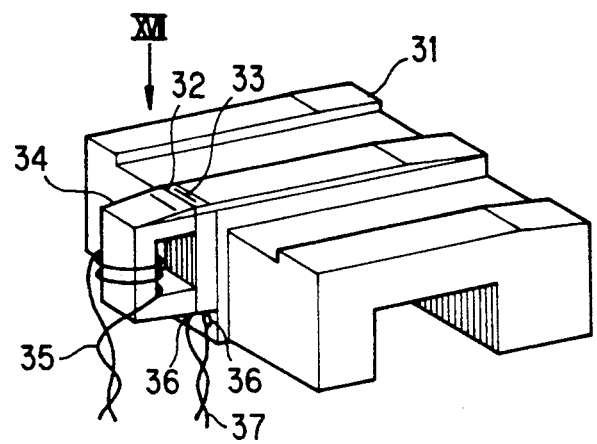
FIG. 16 is a perspective view of a fourth embodiment.
Figure 17:
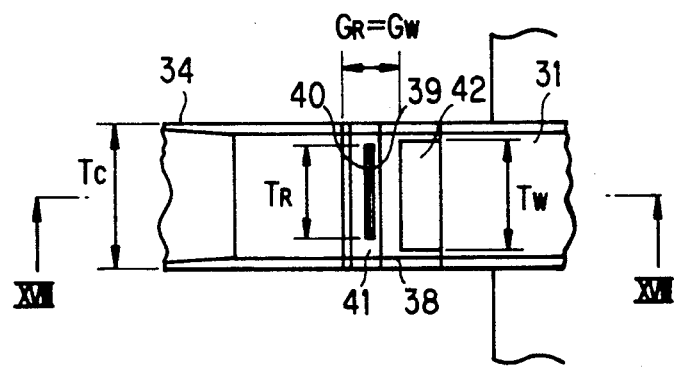
FIG. 17 is a view taken in a direction of arrow XVII in FIG. 16.
Figure 18:
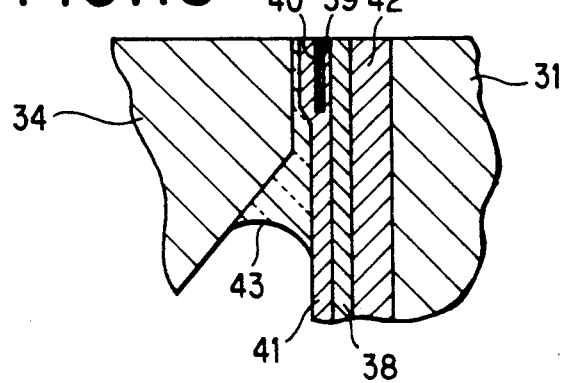
FIG. 18 is a sectional view taken along line XVIII—XVIII in FIG. 17.

Referring now to FIGS. 16 to 18, there is illustrated a fourth embodiment of the present invention in which the magnetic recording/reproducing head assembly is used for a magnetic disk drive.

In the fourth embodiment of the present invention, the first magnetic member 10 of the second embodiment is provided in the form of a core block 34 with a recess on which a coil 35 is mounted and the second magnetic member 21 of the second embodiment is provided in the form of a slider 31 having a floating surface for causing a lift by air current between the slider and the confronting magnetic disk.

An MR element 33 for reading data is provided at a front gap portion 32 confronting the major face of the magnetic disk to effect data recording or reproducing.

The magnetic recording/reproducing head assembly effects recording by magnetic flux caused by a recording current supplied thorough the coil 35, which extends through the core block 34 and the slider 31 and is emanated from the front gap portion 32 confronting the magnetic disk. In reproduction, the MR element provided in the front gap portion 32 senses magnetic flux leaked from the magnetic disk to convert the sensed magnetic flux into a voltage. The so converted voltage is transmitted to an external circuit through leads 37, 37 connected by soldering to lead connecting pads 36, 36, respectively, which are connected to lead conductors (not shown) extending to the MR element 33.

The configuration of the front gap portion 32 will now be described in detail.

On the slider 31 comprising a magnetic base, is formed a soft magnetic film 42 made of a Ni-Fe or Fe-Al-Si alloy of 2 to 5 μm thick by sputtering or deposition. The soft magnetic film 42 is then subjected to etching to have a desired recording track width $T_W$.

An MR film 39 (200 to 900 Å thick) made of Ni-Fe and constituting the MR element 33 is formed on the soft magnetic film 42 through a first non-magnetic film 38 made of non-organic materials of 0.2 to 0.8 μm thick having insulating properties such as $Al_2O_3$, $SiO_2$, etc. Similarly, a shunt film 40 (1000 to 2000 Å thick) is formed on the soft magnetic film 42 closely to the MR film 39 for applying a bias magnetic field to the MR film 39 by electromagnetic induction. These films are formed by sputtering or deposition and subjected to etching to obtain a desired reproducing track width $T_R$ and contours.

On the MR film 39 and the shunt film 40, are formed a second non-magnetic film 41 0.1 to 0.5 μm thick. This film 41 serves to protect the MR element 33 and forms part of the front gap portion 32.

The lead connecting pads 36, 36 are formed to be exposed on the surface by sputtering or etching conductive materials such as Au or Cu on ends of the respective lead conductors (not shown).

The magnetic recording/reproducing head assembly is formed in such a manner that that the magnetic material base with thin films formed thereon is machined into a block having a floating surface and the block is bonded with glass to the core block 34.

The glass to be used for bonding the blocks may be selected, for example, from low-melting PbO glasses of a melting point as low as 300° to 500° C. If the melting point of the glass employed as a bonding agent is not low enough, the magnetic or electric characteristics of the MR film 39 are deteriorated.

With this arrangement, the recording track width $T_W$ can be determined irrespective of the width of the core block 34. Therefore, even when it is required to narrow the track width to increase the recording capacity, the core block 34 may have a sufficient width $T_C$. Thus, the length relationship between $T_W$ and $T_C$ can be set as $T_W < < T_C$, so that the lead connecting pads 36, 36 can be sufficiently spaced from each other as well as they can be formed large enough to allow the leads 37 to extend easily.

This arrangement has another advantage that since the widths $T_W$ and $T_R$ and positions of the recording and reproducing tracks are determined in the thin film forming process, desired alignment between the recording track and the reproducing track can be attained. This will improve the S/N ratio.

In the embodiment just described, the soft magnetic film 42 is disposed between the slider 31 and the MR element 33, but in case where the trailing side is on the core block side, the soft magnetic film 42 may alternatively be interposed between the core block 34 and the MR element 33 to attain the same effects.

Figure 19:
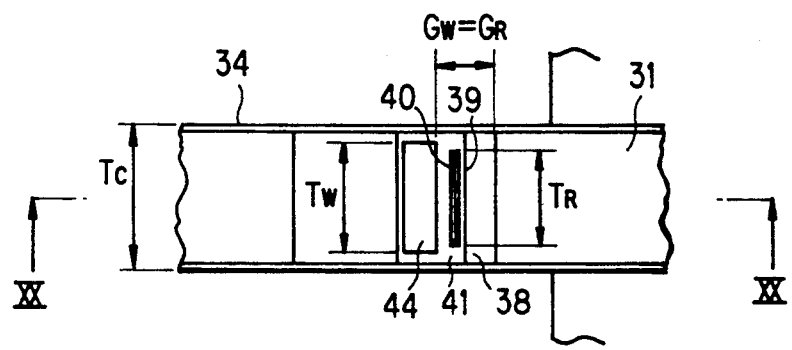
FIG. 19 is a top view of a modification of the fourth embodiment.
Figure 20:
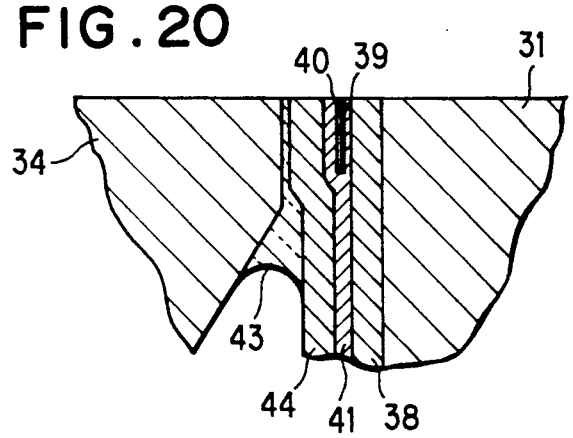
FIG. 20 is a sectional view taken along line XX—XX in FIG. 19.

The latter configuration will be described more particularly referring to FIGS. 19 and 20 as a modification of the fourth embodiment.

According to this modification, a first non-magnetic film 38, an MR film 39, a shunt film 40 and a second non-magnetic film 41 are formed on a slider 31 in a manner as employed in the fourth embodiment. Thereafter, a soft magnetic film 44 is formed on the so formed film laminate on the slider 31.

More specifically, the soft magnetic film 44 is deposited on the second non-magnetic film 41, followed by etching into a desired contour and by deposition of insulating materials such as $Al_2O_3$ and then subjected to etching or grounding to expose the soft magnetic film on the surface.

In the so prepared magnetic head assembly, the centers of the recording and reproducing tracks are accurately aligned with each other and there is a sufficient provision for leads to extend therethrough, which are advantages of the fourth embodiment. Besides, since this configuration contains no glass bonding layer in a reproducing gap length $G_R$ and there is nothing which is detrimental to the reproduction characteristics but possible variation in film precision which may be caused in the thin film forming, the reproduction characteristics can be stable.

The soft magnetic film 44 may be disposed on either side of the MR element 33. In this case, if the material of the soft magnetic films 44 is selected from materials of high flux density, the saturation flux density of the magnetic pole in recording can be increased. As a result of this, the recording density can be increased accordingly.

Figure 21:
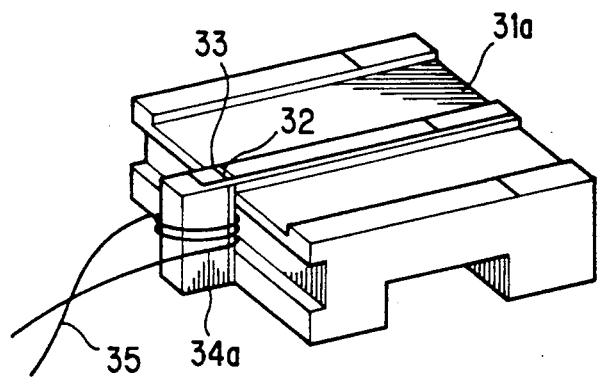
FIG. 21 is a perspective view of a fifth embodiment.
Figure 22:
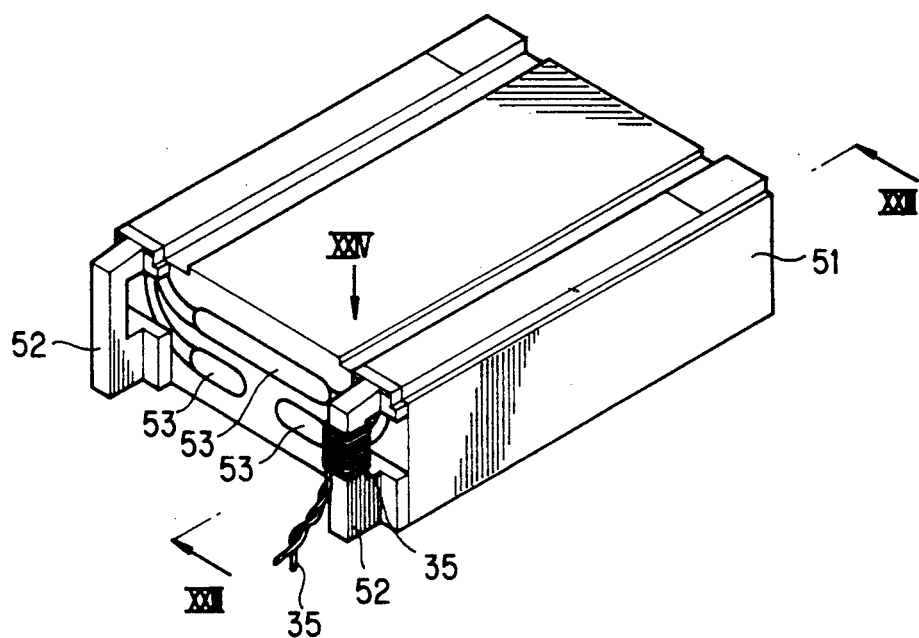
FIG. 22 is a perspective view of a sixth embodiment.
Figure 23:
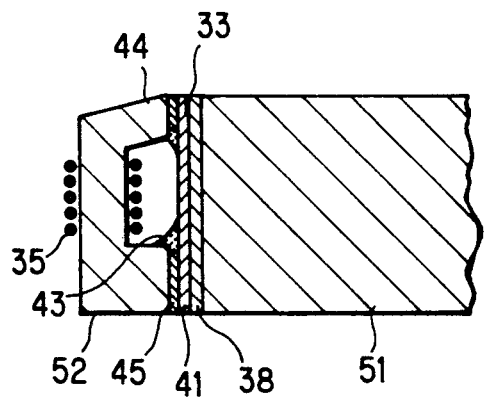
FIG. 23 is a sectional view taken along line XXIII—XXIII in FIG. 22.
Figure 24:
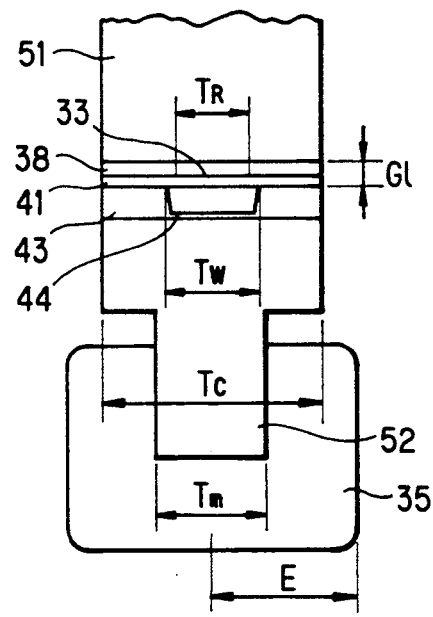
FIG. 24 is a view taken in a direction of arrow XXIV in FIG. 22.

A fifth form of magnetic recording/reproducing head assembly according to the present invention will be described referring to FIG. 21.

This fifth embodiment comprises a thin film structure including an MR element 33 is formed on a core block 34a and a slider 31a having a recess for accommodating a coil therein. The core block 34a and the slider 31a are bonded by a glass material 43. The thin film forming process and machining process to finish into a magnetic head assembly of desired, final contour are similar to those as described above. The configuration of a front gap portion 32 may be substantially the same as that of the fourth embodiment or the modification thereof.

In this embodiment, the coil accommodating recess formed on the slider 31a reduces the weight of the slider 31a. In addition, this arrangement allows the core block 34a to be free from the recess for mounting the coil thereon, also allowing the width of the core block in the direction of the relative movement with the magnetic disk to be narrowed. This further makes the core block lighter in weight.

The slider 31a or the core block 34a or both of them may be made of non-magnetic materials such as $Al_2O_3$ to improve the resistance to wear against the confronting recording face of the magnetic disk. In this case, the slider 31a, core block 34a or the both which is or are made of non-magnetic materials is or are provided with a magnetic thin film as described above to form a magnetic circuit.

A sixth form of magnetic recording/reproducing head assembly according to the present invention will be described referring to FIGS. 22 to 29.

The magnetic recording/reproducing head assembly of this sixth embodiment is substantially the same as that of the second or the modification of the fourth embodiment, except that two core blocks 52, 52 are mounted on a slider 51 and the configuration of the core blocks 52, 52 and the positional arrangement of lead connecting pads 53, 53, 53 are different.

The slider 51 has, at each of opposite ends in the direction of the track width, a thin film structure for mounting the core block 52 thereon. The thin film structure is formed by the thin film forming process as described above and comprises a first non-magnetic film 38, an MR element 33, a second non-magnetic film 41, a soft magnetic film 44 and a back-gap soft magnetic film 45.

On the first non-magnetic film 38, the MR element 33 is provided to extend towards the central portion between the core blocks 52, 52 to form lead conductors. The lead connecting pads 53, 53, 53 are connected to the ends of the lead conductors.

Each of the core blocks 52, 52 is shaped so that it has a bonding portion with the slider 51 whose length in the direction of the track width is larger than other portions of the block. This shape assures the bonding portion has sufficient bonding strength.

On the other hand, the core block 52 may have a reduced portion on which the coil 35 is mounted. This enables the core block to reduce its weight. Further, a distance E (FIG. 24) from the center of the said reduced portion on which the coil is mounted to the outer periphery of the coil 35 can be shortened. This enables the moment of inertia of the coil 35 to be reduced.

Such an arrangement in which the lead connecting pads 53, 53, 53 are provided around the central portion of the slider in the direction of the track width is advantageous in that the length of the slider in the direction perpendicular to the major face of the magnetic disk can be shortened. This enables the slider to be lighter in weight.

As described above, the magnetic recording/reproducing head assembly of this embodiment is essentially similar in configuration to the second embodiment or the modification of the fourth embodiment. Therefore, this magnetic head assembly essentially has similar effects to those of the foregoing embodiments.

The manufacturing process of the magnetic recording/reproducing head assembly of the embodiment will now be described.

Figure 25:
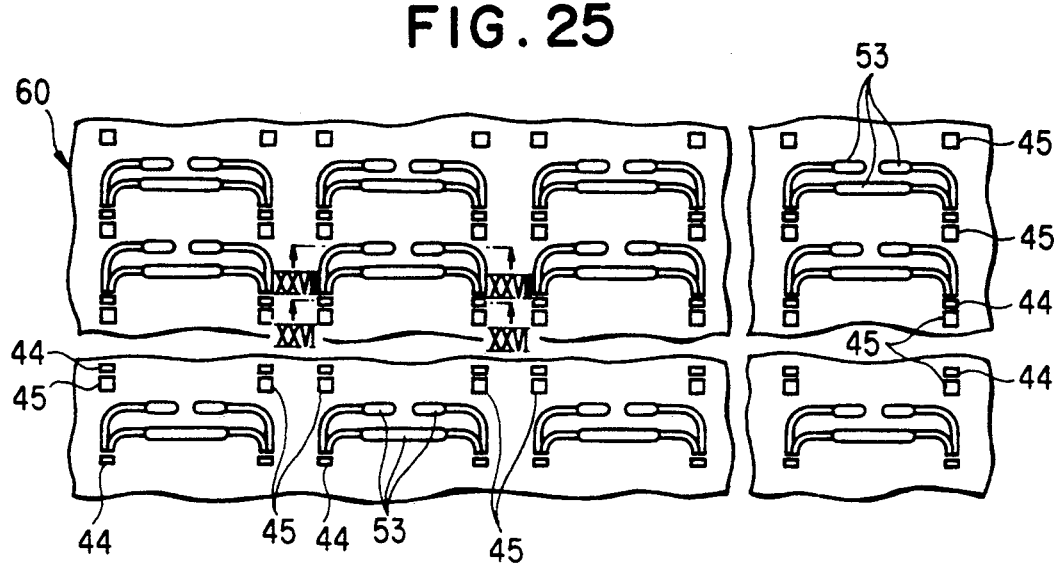
FIG. 25 is a front view of a slider base.
Figure 26:
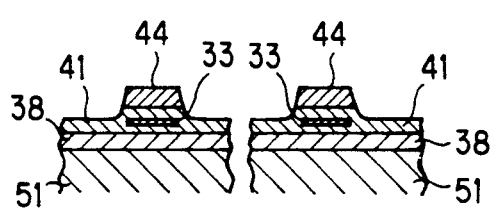
FIG. 26 is a sectional view taken along line XXVI—XXVI in FIG. 25.
Figure 27:
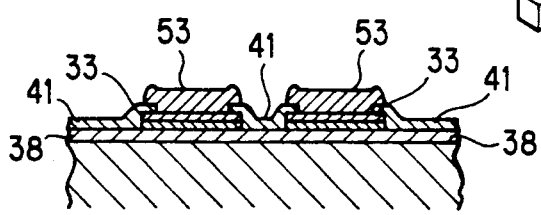
FIG. 27 is a sectional view taken along line XXVII—XXVII in FIG. 25.
Figure 28:
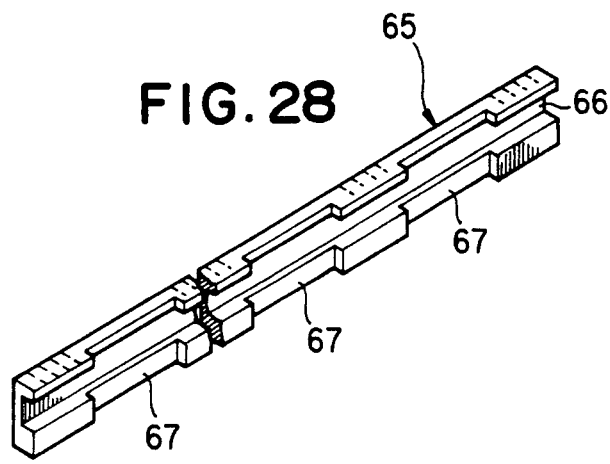
FIG. 28 is a perspective view of a core block lump including five latent core blocks.
Figure 29:
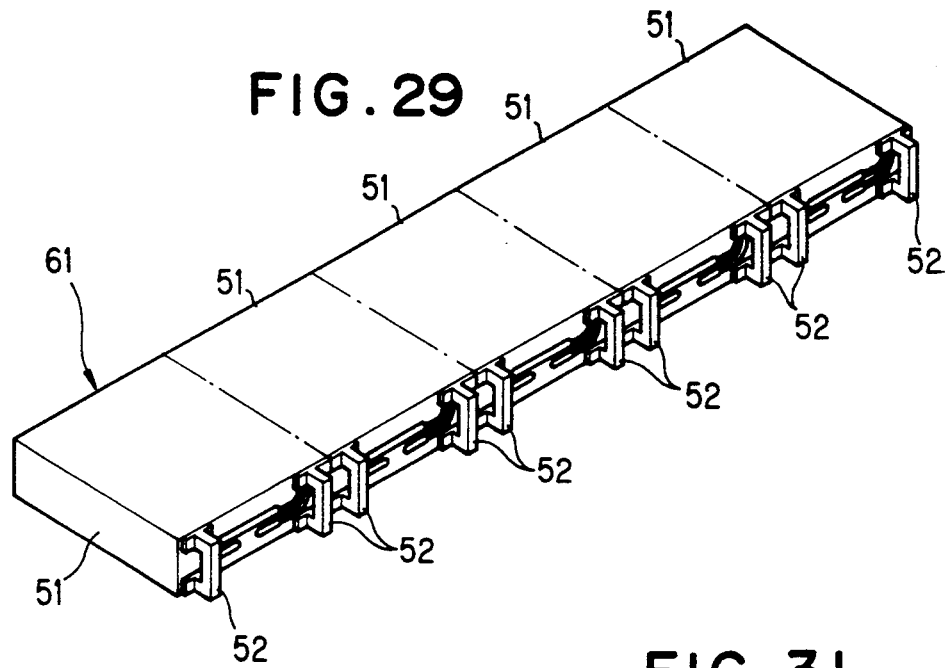
FIG. 29 is a perspective view of a slider block including five latent sliders.

A thin film structure is first formed on a slider base 60 out of which a plurality of sliders 51 are cut or gotten, by a thin film forming process as illustrated in FIG. 25. A slider block 61 which includes five latent sliders is cut away from the slider base 60 with the thin film laminate formed thereon.

On the other hand, a core block lump 65 including five latent core blocks and matable with the slider block 61 including five latent sliders is prepared. The core block 65 has bonding surfaces applied with bonding glass materials 43 to be bonded to the slider block 61.

The core block lump 65 is formed with a recess 66 for mounting coils thereon and thinned portions 67, 67 . . . for separating the core block lump 65 into core blocks 52, 52 . . .

The glass materials on the bonding surfaces of the core block lump 65 are then heated to bond the core block lump 65 to the slider block 61.

Then, the core block lump 65 is cut and the surface of the slider 51 to confront the recording medium is subjected to machining to form a floating surface. Thereafter, the surface is finished by lapping. If the MR element 33 and the soft magnetic film 44 have a machining termination detecting pattern as mentioned in connection with the first embodiment, the lapping is made according to the pattern.

The slider block 61 is then severed into five sliders 51, 51 . . . and the severed surfaces are subjected to finishing.

Finally, the coils 35 are mounted on the core blocks 52, 52 . . . , respectively, and leads are connected to the lead connecting pads 53 to complete the floating type magnetic recording/reproducing head assembly.

Figure 30:
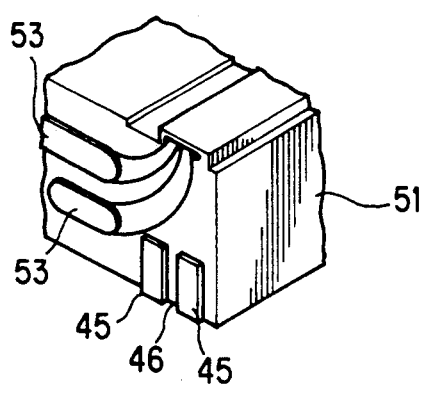
FIG. 30 is a fragmentary view showing a principal portion of a modification of the sixth embodiment.

The back-gap soft magnetic film 45 formed on the second non-magnetic film 41 may be provided in the form of two islands of soft magnetic film as illustrated in FIG. 30. When two or more islands of soft magnetic films 45, 45 are formed to provide stepped portions on the bonding surface with the core block 52, the adhesive 43 may easily enter the spaces formed between the islands. Thus, the bonding reliability between the core block 52 and the slider 51 can be enhanced. Although the back-gap soft magnetic films are provided in the form of islands, the bonding surface at the back gap portion can be large and the magnetic resistance at the bonding surface does not increase, suppressing deterioration of recording characteristics.

In the embodiment just described, the slider 51 and/or the core block 52 may be made of non-magnetic ceramics having good resistance to wear. When the slider 51 and/or the core block 52 are made of non-magnetic ceramics, the contact-start-stop resistance characteristics or resistance to head assembly crash of the floating type magnetic recording/reproducing head assembly can be improved.

Figure 31:
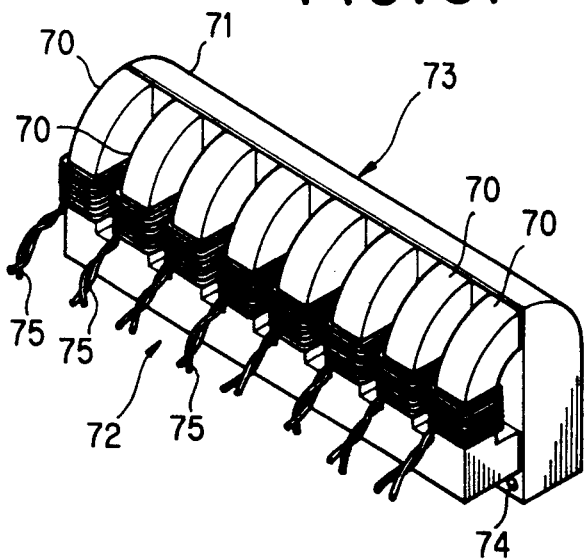
FIG. 31 is a perspective view of a seventh embodiment.

The foregoing embodiments are directed to magnetic head assemblies for use in disk drive system. The invention is applicable also to a magnetic head assembly for a magnetic tape drive system. This head assembly will now be described referring to FIG. 31 as a seventh embodiment of the invention.

The magnetic recording/reproducing head assembly of the seventh embodiment is of a multi-track type. A plurality of cores 70 on the leading side and a plurality of cores 71 on the trailing side are arranged integrally in a direction of the track width.

Between each core 70 on the leading side and the confronting core 71 on the trailing side, a thin film laminate as described in connection with the first embodiment is formed. The core 70 on the leading side and the core 71 on the trailing side correspond to the first magnetic member 10 and the second magnetic member 21 of the first embodiment, respectively.

The core 70 on the leading side and the core 71 on the trailing side bonded through the laminate have a surface confronting a magnetic tape in use. The surface has a contour suitable for providing stable tape touch without rolling in air.

The magnetic recording/reproducing head assembly of the seventh embodiment is prepared by the following procedures. First, either a core block of the leading side having a plurality of cores 70 or a core block 73 of the trailing side having a plurality of cores 71 are formed with a thin film laminate as described above. Then the core blocks are bonded through the thin film laminate and the surface to be in contact with the magnetic tape is subjected to machining. Finally, leads are connected to lead connecting pads 74, respectively.

The configuration of the seventh embodiment is basically the same as that of the first embodiment, but the configuration of the second or third embodiment may also be applied to a magnetic recording/reproducing head assembly for multi-track magnetic tape.

What is claimed is:

1. A magnetic recording/reproducing head assembly comprising:
   a first magnetic path forming member;
   a second magnetic path forming member which forms a magnetic path in cooperation with the first magnetic path forming member;
   a film laminate disposed between the first magnetic path forming member and the second magnetic path forming member at least at a side of the head assembly to be disposed adjacent to a recording medium during a recording/reproducing operation;
   said film laminate including a magnetic detecting element for detecting a change in a magnetic field and at least one soft magnetic film; and
   a coil wound around the first magnetic path forming member for at least enabling excitation of the at least one soft magnetic film during a recording operation.

2. A magnetic recording/reproducing head assembly according to claim 1, wherein both the first magnetic path forming member and the second magnetic path forming member are made of magnetic materials.

3. A magnetic recording/reproducing head assembly according to claim 1, wherein both the first magnetic path forming member and the second magnetic path forming member are made of non-magnetic materials in combination with magnetic materials for forming the magnetic path.

4. A magnetic recording/reproducing head assembly according to claim 1, wherein one of the first magnetic path forming member and the second magnetic path forming member is made of a magnetic material, and the other one of the first magnetic path forming member and the second magnetic path forming member is made of a non-magnetic material and a magnetic material for forming the magnetic path.

5. A magnetic recording/reproducing head assembly according to claim 1, wherein one soft magnetic film of said at least one soft magnetic film is in contact with the first magnetic path forming member.

6. A magnetic recording/reproducing head assembly according to claim 1, which further comprises:
   a non-magnetic film having insulating properties and provided adjacent to the magnetic detecting element;
   lead conductors provided on the non-magnetic film for supplying a current to the magnetic detecting element; and
   lead connecting pads provided at respective ends of the lead conductors for enabling connection of leads.

7. A magnetic recording/reproducing head assembly according to claim 1, wherein said at least one soft magnetic film has a length in a direction of a width of a track to be recorded by the head assembly which is longer than that of the magnetic detector element.

8. A magnetic recording/reproducing head assembly according to claim 1, wherein said at least one soft magnetic film has a length in a direction of a width of a track to be recorded by the head assembly which is longer than that of the magnetic detecting element.

9. A magnetic recording/reproducing head assembly according to claim 1, wherein said first magnetic path forming member has a portion around which the coil is wound, said portion having a length in a direction of a width of a track to be recorded by the head assembly which is shorter than that of the side of the head assembly to be disposed adjacent to the recording medium during a recording/reproducing operation.

10. A magnetic recording/reproducing head assembly according to claim 1, wherein at least one of the first magnetic path forming member and the second magnetic path forming member has a bonding surface having spaces for introducing a bonding agent thereinto.

11. A magnetic recording/reproducing head assembly comprising:
   a plurality of first magnetic path forming members;
   a second magnetic path forming member which forms a plurality of respective magnetic paths in cooperation with the first magnetic path forming members;
   a plurality of film laminates disposed between respective ones of the first magnetic path forming members and the second magnetic path forming member at least at a side of the head assembly to be disposed adjacent to a recording medium during a recording/reproducing operation;
   each of said film laminates including a magnetic detecting element for detecting a change in a magnetic field and at least one soft magnetic film; and
   a plurality of coils wound around respective ones of the first magnetic path forming members for at least enabling excitation of respective ones of the at least one soft magnetic film during a recording operation.

12. A magnetic recording/reproducing head assembly according to claim 11, wherein all of the first magnetic path forming members and the second magnetic path forming member are made of magnetic materials.

13. A magnetic recording/reproducing head assembly according to claim 11, wherein all of the first magnetic path forming member and the second magnetic path forming member are made of non-magnetic materials in combination with magnetic materials for forming that magnetic paths.

14. A floating type magnetic recording/reproducing head assembly comprising:
   a first magnetic path forming member;
   a second magnetic path forming member which forms a magnetic path in cooperation with the first magnetic path forming member;
   a film laminate disposed between the first magnetic path forming member and the second magnetic path forming member at least at a side of the head assembly to be disposed adjacent to a recording medium during a recording/reproducing operation;
   said film laminate including a magnetic detecting element for detecting a change in a magnetic field and at least one soft magnetic film; and
   a coil wound around the first magnetic path forming member for at least enabling excitation of the at least one soft magnetic film during a recording operation;
   said second magnetic path forming member being provided in the form of a slider member having a floating face; and
   said first magnetic path forming member being provided in the form of a core member.

15. A magnetic recording/reproducing head assembly according to claim 14, wherein both the first magnetic path forming member and the second magnetic path forming member are made of magnetic materials.

16. A magnetic recording/reproducing head assembly according to claim 14, wherein both the first magnetic path forming member and the second magnetic path forming member are made of non-magnetic materials in combination with magnetic materials for forming the magnetic path.

17. A magnetic recording/reproducing head assembly according to claim 14, wherein one of the first magnetic path forming member and the second magnetic path forming member is made of a magnetic material and the other one of the first magnetic path forming member and the second magnetic path forming member is made of a non-magnetic material and a magnetic material for forming the magnetic path.

18. A floating type magnetic recording/reproducing head assembly according to claim 14, wherein said slider member has a recess for receiving the coil wound around the first magnetic path forming member provided in the form of a core member, and the film laminate is formed on the core member.

* * * * *